(12) United States Patent
Hutto (10) Patent No.: US 10,674,680 B2
(45) Date of Patent: Jun. 9, 2020

(54) FAN COIL FOR GREENHOUSE

(71) Applicant: Horticultural Solutions Ltd., Wheat Ridge, CO (US)

(72) Inventor: Shane Hutto, Idaho Springs, CO (US)

(73) Assignee: Horticultural Solutions Ltd., Wheat Ridge, CO (US)

( * ) Notice: Subject to any disclaimer, the term of this patent is extended or adjusted under 35 U.S.C. 154(b) by 0 days.

(21) Appl. No.: 16/047,225

(22) Filed: Jul. 27, 2018

(65) Prior Publication Data

US 2019/0037780 A1 Feb. 7, 2019

Related U.S. Application Data

(60) Provisional application No. 62/658,355, filed on Apr. 16, 2018, provisional application No. 62/541,423, filed on Aug. 4, 2017.

(51) Int. Cl.
| | | |
|---|---|---|
| *A01G 9/24* | (2006.01) | |
| *F24F 1/0007* | (2019.01) | |
| *F24F 3/16* | (2006.01) | |
| *F24F 13/22* | (2006.01) | |

(52) U.S. Cl.
CPC ............ *A01G 9/246* (2013.01); *F24F 1/0007* (2013.01); *F24F 3/1603* (2013.01); *F24F 3/166* (2013.01); *F24F 13/222* (2013.01); *F24F 2003/1667* (2013.01)

(58) Field of Classification Search
CPC ............. A01G 9/24; A01G 9/26; A01G 9/246
See application file for complete search history.

(56) References Cited

U.S. PATENT DOCUMENTS

| | | | | |
|---|---|---|---|---|
| 3,949,522 A | * | 4/1976 | Kehl ................... | A01G 9/246 47/17 |
| 4,163,342 A | * | 8/1979 | Fogg ................... | A01G 7/045 47/58.1 R |
| 4,292,762 A | * | 10/1981 | Fogg ................... | A01G 9/246 47/17 |
| 4,783,971 A | | 11/1988 | Alba | |
| 6,705,043 B1 | * | 3/2004 | Opdam ............... | A01G 9/243 47/17 |

(Continued)

FOREIGN PATENT DOCUMENTS

| | | |
|---|---|---|
| WO | 03/054457 A1 | 7/2003 |
| WO | 2016/168515 A1 | 10/2016 |

OTHER PUBLICATIONS

International Search Report and Written Opinion of International Searching Authority for PCT Application No. PCT/US2018/044050 dated Oct. 10, 2018.

*Primary Examiner* — Monica L Williams
*Assistant Examiner* — Aaron M Rodziwicz
(74) *Attorney, Agent, or Firm* — Schott P.C.

(57) ABSTRACT

A fan coil apparatus for a closed greenhouse that recirculates are within the greenhouse includes a housing with an intake and an outtake further including a filter that filters recirculating air that enters the intake, cooling coils that cool the recirculating air and condense water therefrom, heating coils that heat the recirculating air, a sterilization system that kills and prevents the spread of airborne pathogens, and a fan that directs the recirculating air through the outtake outside the housing.

20 Claims, 7 Drawing Sheets

(56) References Cited

U.S. PATENT DOCUMENTS

| | | | |
|---|---|---|---|
| 8,707,617 B2* | 4/2014 | Houweling | A01G 9/246 47/17 |
| 9,161,498 B1* | 10/2015 | Shelor | A01G 9/18 |
| 2002/0124992 A1* | 9/2002 | Rainer | G05D 23/1931 165/11.1 |
| 2004/0148950 A1* | 8/2004 | Catzel | F24F 3/08 62/180 |
| 2004/0194371 A1* | 10/2004 | Kinnis | A01G 9/246 47/17 |
| 2005/0005510 A1* | 1/2005 | Brault | A01G 9/246 47/17 |
| 2005/0005528 A1* | 1/2005 | Brault | A01G 9/14 52/63 |
| 2008/0000151 A1* | 1/2008 | Houweling | A01G 9/246 47/17 |
| 2010/0126062 A1* | 5/2010 | Houweling | A01G 9/246 47/17 |
| 2012/0311926 A1* | 12/2012 | Mittelmark | F24F 3/16 47/17 |

* cited by examiner

FAN COIL FOR GREENHOUSE

BACKGROUND

Greenhouses have long been used to grow different varieties of plants, including ornamental plants and fruit and vegetable producing plants. Greenhouses often include a structure with a clear roof and walls. Solar radiation warms the greenhouse's interior. The closed environment of a greenhouse presents certain challenges compared with outdoor production. Pests and diseases need to be controlled and irrigation is required to provide water. Greenhouses must also be climate controlled to compensate for extreme highs and lows of heat and humidity, and to generally control the environmental conditions such as the level of carbon dioxide ($CO_2$).

Most greenhouses encourage airflow from outside to recirculate the air in the greenhouse. This is often done using HVAC systems that cycle air from inside and outside the greenhouse.

Recently, some greenhouses have begun using a semi-closed greenhouse design. The semi-closed greenhouses are mechanically cooled in the summer with a heat pump. The semi-closed greenhouse reduces ventilation, which in a healthy semi-closed system introduces fewer pathogens to the growing environment and requires less pesticide or chemical treatment, increases CO2 levels in the greenhouse that encourages growing, and from an energetic viewpoint, the semi-closed system is beneficial for (unilluminated) fruit-vegetables, tropical pot plants and cultivation where both heat and cold are needed.

As described in U.S. Pat. No. 8,706,617 to Houweling, one type of semi-closed greenhouse operates in different modes to control the temperature and environmental conditions within the greenhouse. In one mode, ambient air is drawn into the greenhouse, and in other modes, air from within the greenhouse is re-circulated. In still other modes, the system draws ambient air in combination with recirculation of air, and when ambient air is drawn in, it can also be cooled.

After drawing in the air, it is circulated through the greenhouse through vents (tubes). Fans or other mechanisms for drawing air may be arranged on the tubes to supply a flow of air volume to the tubes to cool the greenhouse during the expected elevated outside (external) temperatures and to heat the greenhouse during expected low temperatures.

But even the semi-closed system draws air from outside the greenhouse into the greenhouse, which air will contain pathogens. Further, most semi-closed systems employ a simple heat pump that allows for only coarse temperature and humidity adjustment. And finally, as shown in the Houweling patent, the semi-closed greenhouses require a climate control room or area to pre-treat the air before circulation, which area takes up potential growing space and requires separate construction.

SUMMARY OF THE EMBODIMENTS

A fan coil apparatus for a closed greenhouse that recirculates are within the greenhouse includes a housing with an intake and an outtake further including a filter that filters recirculating air that enters the intake, cooling coils that cool the recirculating air and condense water therefrom, heating coils that heat the recirculating air, a sterilization system that kills and prevents the spread of airborne pathogens, and a fan that directs the recirculating air through the outtake outside the housing.

DETAILED DESCRIPTION OF THE EMBODIMENTS

Figure 1A:
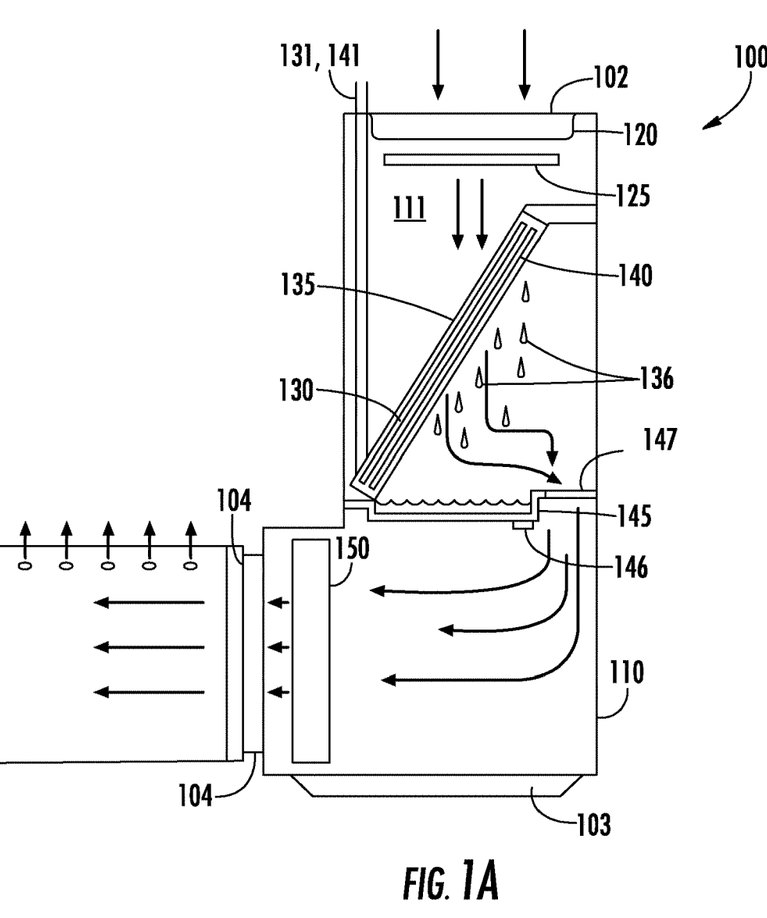
FIG. 1A shows a cross sectional schematic view inside the fan coil apparatus and ducting.
Figure 1B:
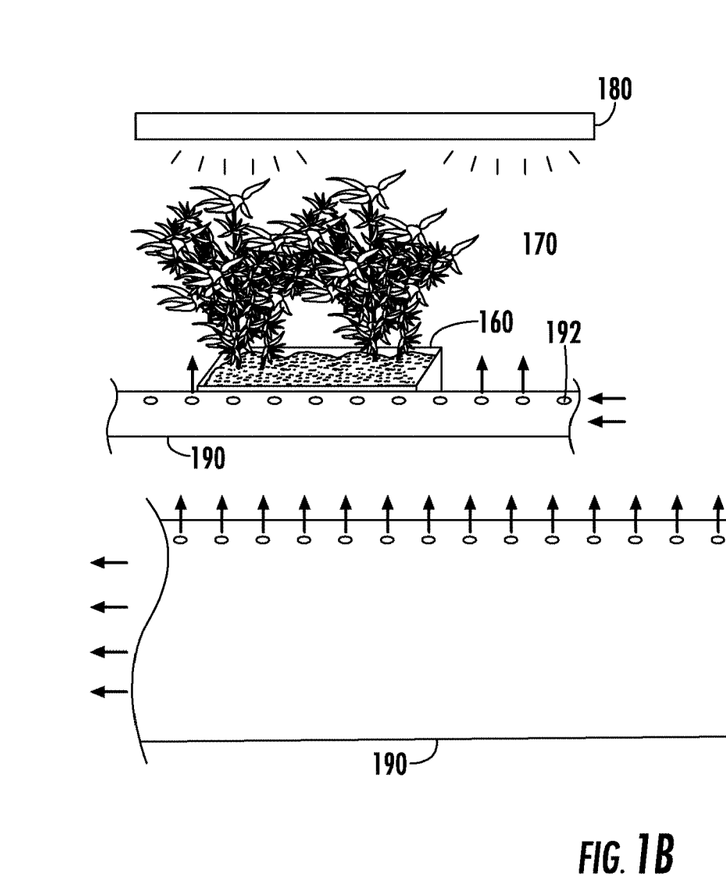
FIG. 1B shows a partial overview of the ducting inside a greenhouse setting.
Figure 1C:
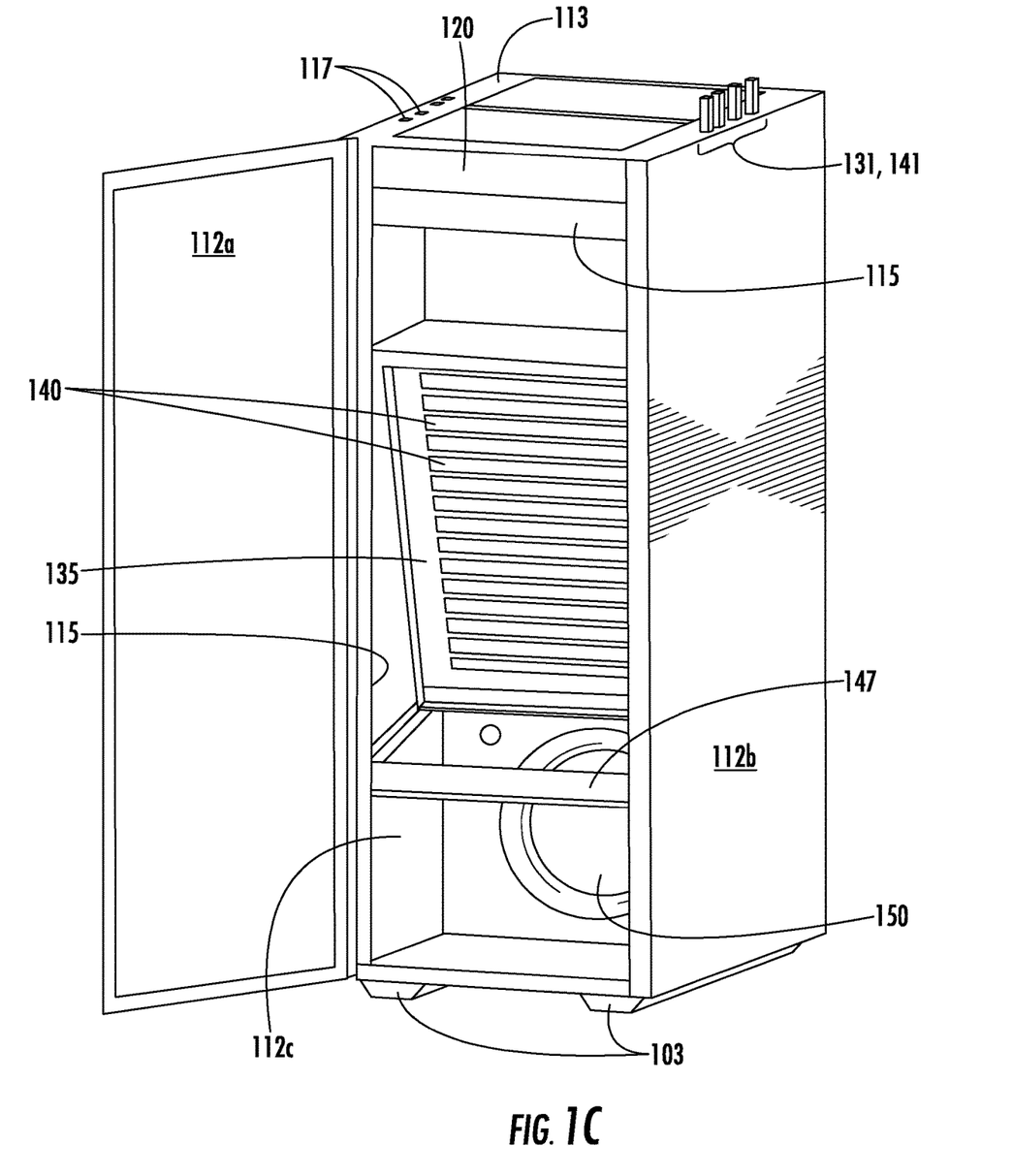
FIGS. 1C-1F show perspective, front elevation, side, and top views of the fan coil apparatus.
Figure 1D:
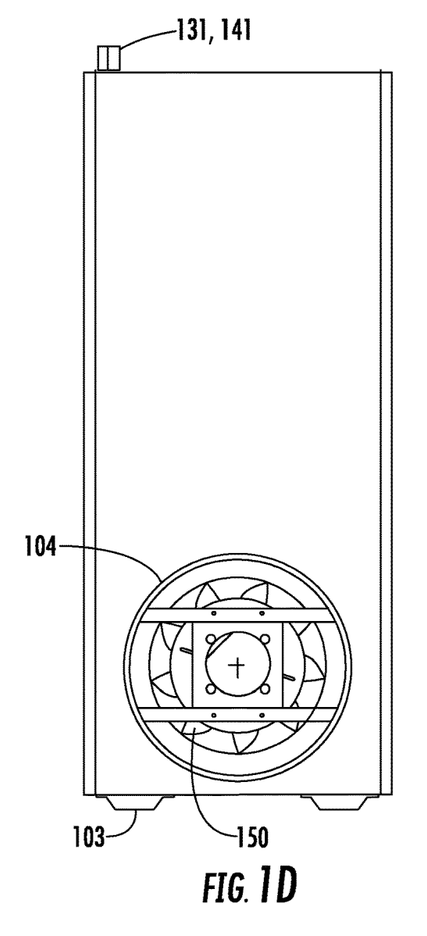
Figure 1E:
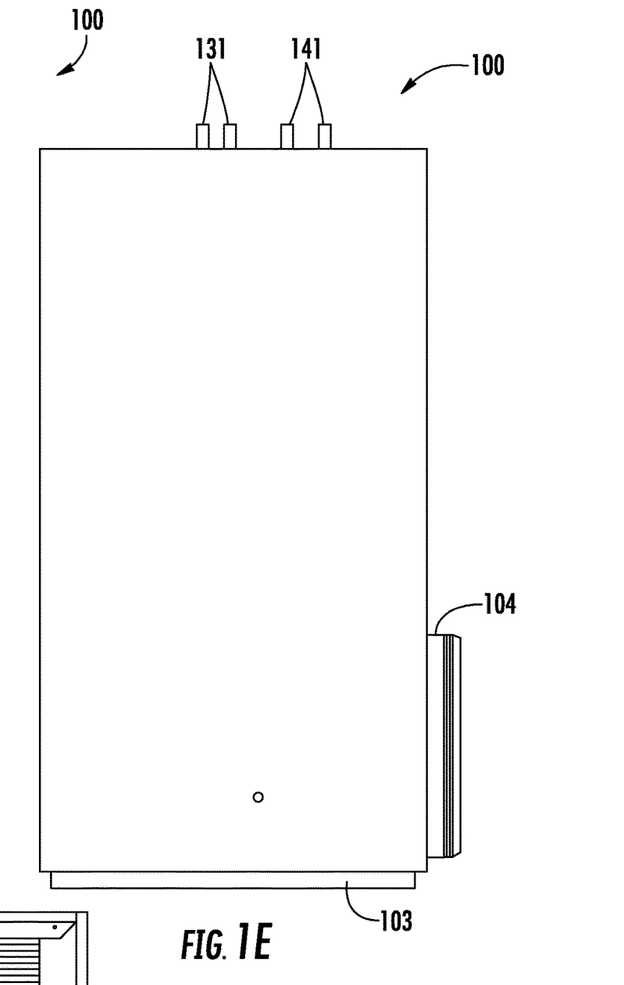
Figure 1F:
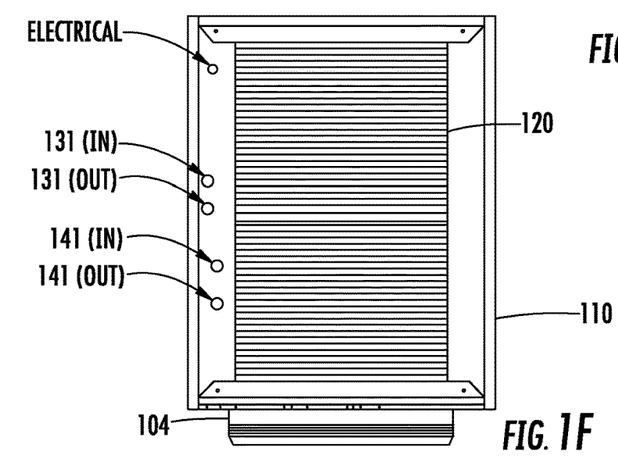
Figure 2A:
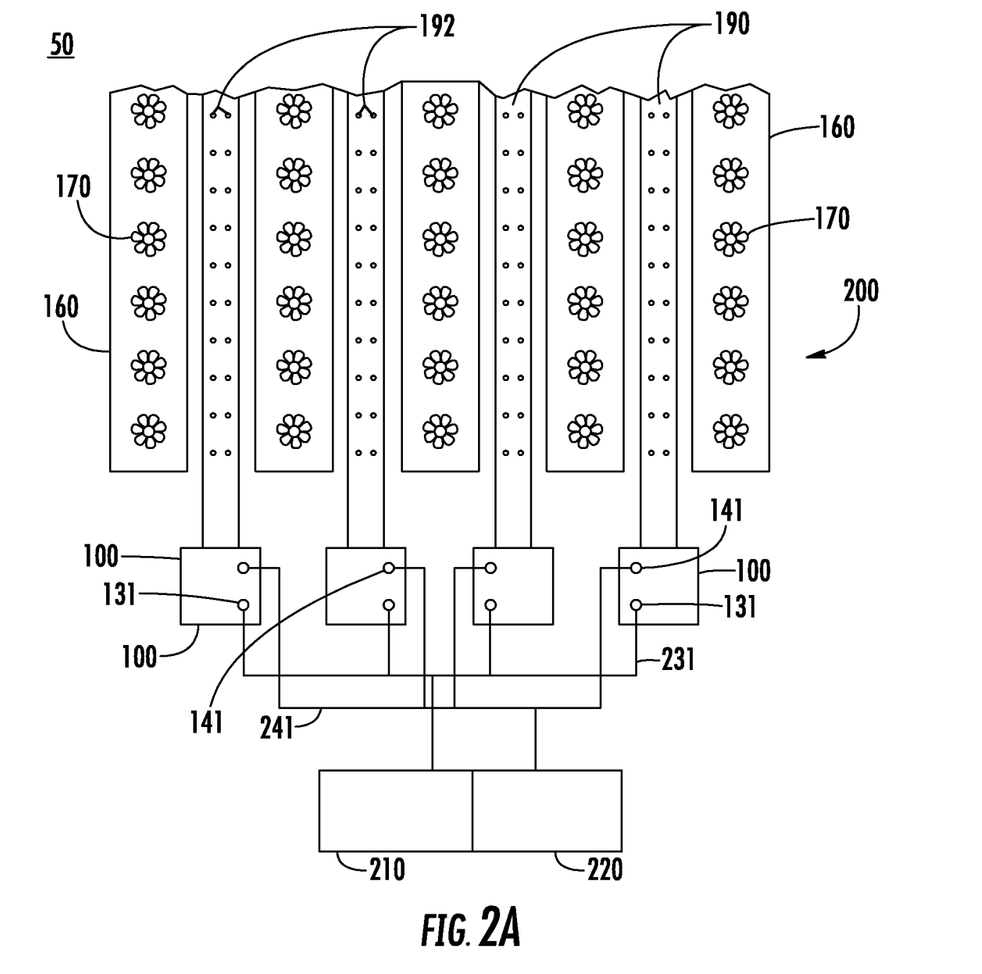
FIGS. 2A and 2B show an overview of a greenhouse with ducting running therethrough.
Figure 2B:
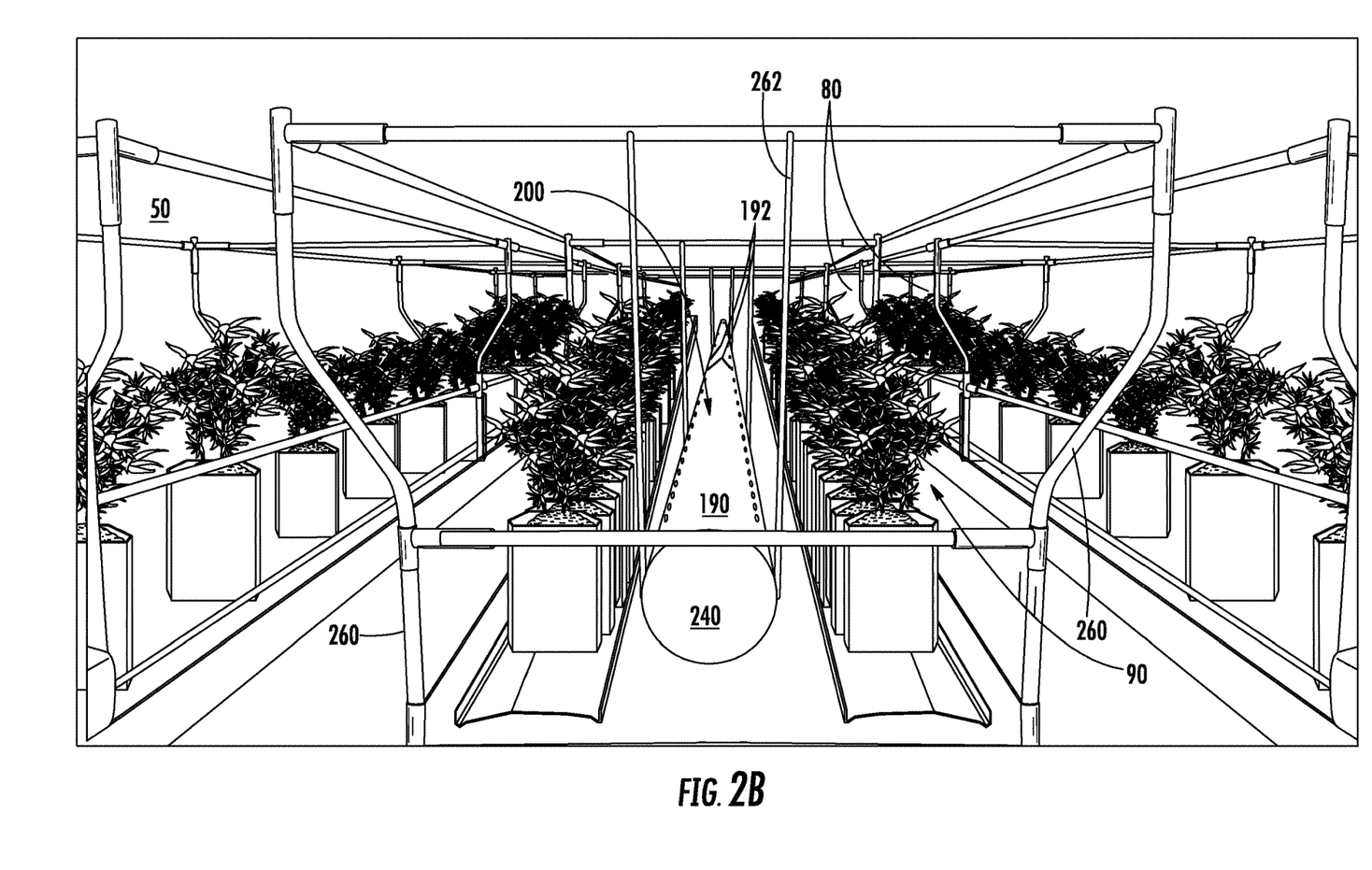
Figure 3:
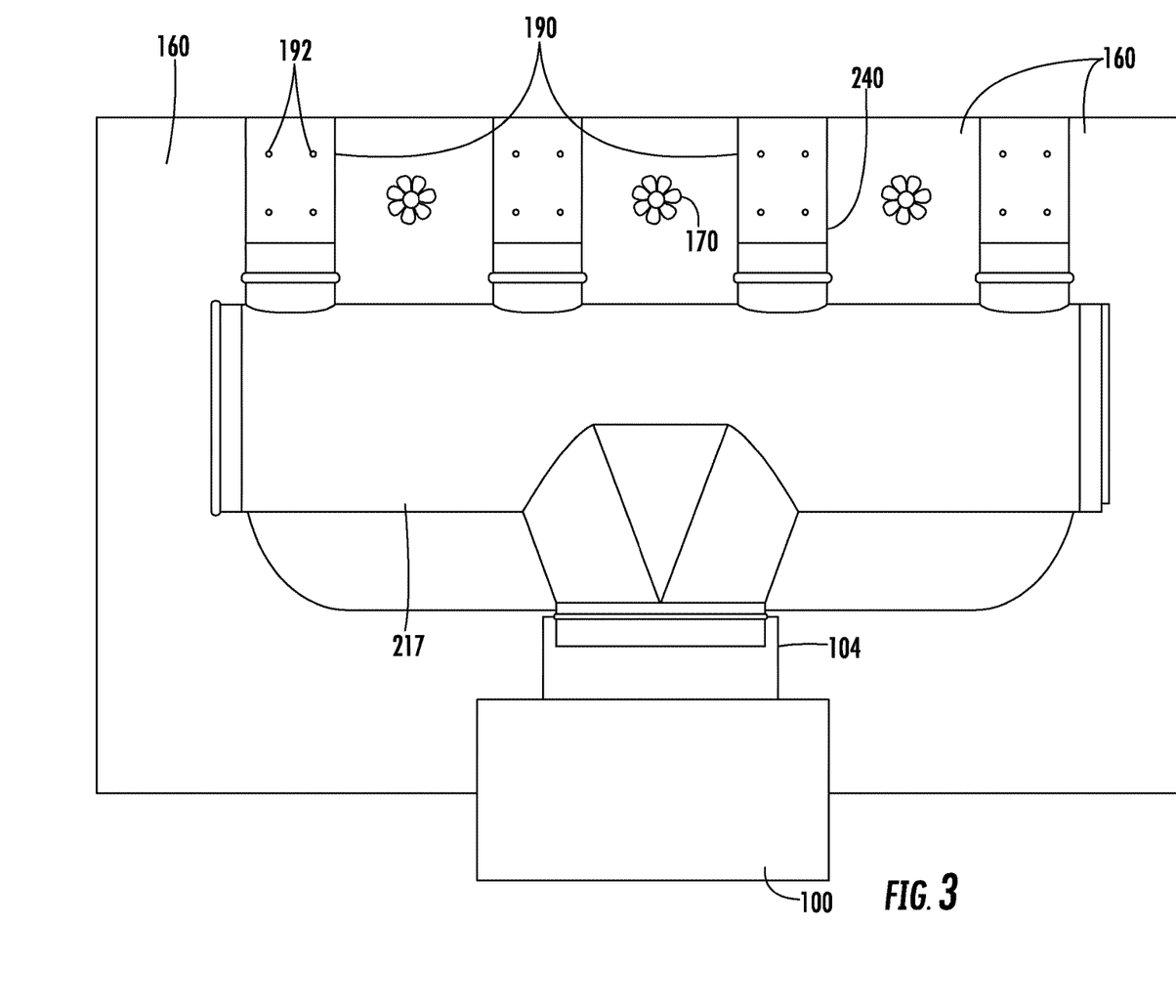
FIG. 3 shows a possible manifold for use with the fan coil apparatus.
Figure 4:
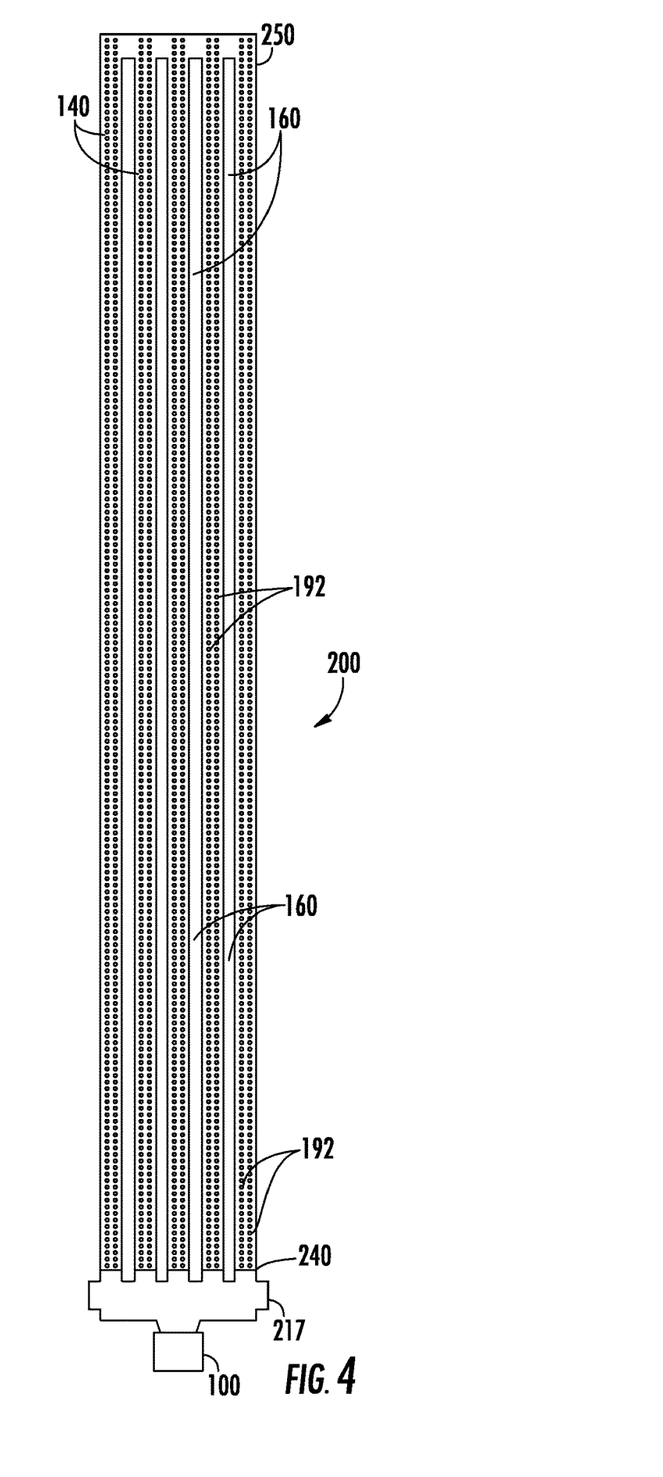
FIG. 4 shows a ducting layout for a potential greenhouse.

The present invention seeks to address these shortcomings using an airflow system shown as an overview in FIGS. 2-4, which uses a fan coil apparatus 100 shown in FIGS. 1A-1F within a greenhouse setting that includes grow tables 160 that hold plants 170 and grow lights 180. A water source (not shown) provides water to the plants 170.

The airflow system includes at least the fan coil apparatus 100 and ducting 190. It may also include joints, end caps and other devices to direct the air flow through the greenhouse. These joints and end caps are such as would be known to a person skilled in the art in directing airflow through ducted airflow systems.

The fan coil apparatus 100 may include a housing 110 that defines a space 111 behind removable access panels 112a, 112b, 112c shown in FIG. 1C. The panels 112a, 112b, 112c may be side or top/bottom hinged, as hinged panel 112a has a side hinge. The side hinge may be of a removable type such that the entire panel may be removable for service. The panels 112a, 112b, 112c may engage a fan coil apparatus frame 115 in a press fit, removable pin, or removable threaded engagement, either using a tool or hands, such as using a wing nut.

Within the fan coil apparatus space 111, as best shown in FIGS. 1A and 1C, are a filter 120, cooling coil 130 and heating coil 140 within a coil housing 135, sterilization system 125 (which may be the UV system below or included as the filter 120 and/or coils 130, 140), drip pan 145, and fan 150. FIGS. 1A-1F show the components in a figurative way.

Tracing the flow of air and its processing through the fan coil apparatus 100, air enters the fan coil apparatus 100 through an intake 102. Although the intake can be connected to purely ambient air and the fan coil apparatus would be effective, the fan coil apparatus 100 is designed for a fully-closed greenhouse, thus the intake 102 draws air from the indoor air within the greenhouse. For simplicity, this application will refer to this air as recirculated air, even though at any time, some of the air passing through the intake 102 may not have previously passed through the intake 102.

After passing through the intake 102, the recirculated air passes through a filter 120, which may be a single or multiple filters. The filter 120 may be, for example, be a disposable passive filter or an active-field polarized media filter that may remove even small particles like VOCs from the air. The air filter 120 may be a minimum 2″ or 4″ MERV 10 filter that could be changeable approximately every 6 months in normal operation.

Polarized filtration may greatly improve air cleaning performance due to the three-dimensional loading of particles to media fibers, as opposed to one-dimensional trapping seen in traditional passive filtration. Another inherent mechanism of polarization uses particle agglomeration whereby ultra-fine particles become polarized after passing through the air cleaner and because of polarization are attracted to each other, in addition to other chemical contaminants, to form bigger particles that are subsequently captured.

An ultraviolet treatment system 125 may then treat the air, and in particular render biological contaminants inert. If using a UV light air purifier, it is important to block ambient light from escaping the purification area as this light may adversely affect plant growth. One advantage of the UV and/or passive purification system is that it can replace a separate air purification system usually used in plant husbandry facilities. Thus, not only does the system described herein promote airflow under a canopy and reduce plant damage in that way, it also saves a horticulturalist money from having to buy and maintain a separate air purification system.

The cooling or evaporator coils 130 are located downstream of the filter 120 and ultraviolet treatment system, within the coil housing 135 that has openings, through which the heating coils 140 can be seen in FIG. 4, and which allow for passing condensate. The coil housing 135 is angled with respect to airflow, which increases the surface area of the cooling and heating coils 130, 140 exposed to airflow. The cooling coils 130 serve to cool and dehumidify the recirculated air. The cooling coils 130 may be made from thin copper tubing and have an inlet and an outlet served by cooling piping 131 for the inflow and outflow of a refrigerant, which may be any suitable refrigerant fluid, although water is contemplated for the closed greenhouse. In such a system, cold water (which may contain antifreeze additives) may be used for cooling. The water-cooled (and heated system) may be advantageous in a smaller space or where there are multiple units. The water-cooled system is less expensive to maintain, is environmentally friendly, and energy efficient. Cold water can be provided from a stable cold source such as ground water or from a chiller system.

The heating and cooling coils 130, 140 pattern can be based on one of many known heat exchanger coil designs in the refrigeration industry. The cooling coils 130 may be made of copper or any material having a suitably high degree of thermal conductivity. The cooling coil may be a 7 ton chiller water coil and the heating coils 140 may be a 2 ton hot water coil.

The cooling piping 131 (as well as the heading piping 141) may include inlet and outlet pipes connected to their respective coils 130, 140. The piping 131, 141 may be located through holes 117 in a top 113 of the fan coil apparatus 100. This allows for easier cooling/heating pipe runs above multiple fan coil apparatuses 100 that could push airflow through multiple ducting runs 190 in a greenhouse, as can be appreciated in FIG. 2A, which shows multiple fan coil apparatuses 100 connected to central cooling unit 210 and central heating unit 220 view further interim piping runs 231, 241. For simplicity, the return heating and piping is not shown.

The cooling coils 130 may cool the air below its ideal temperature point in order to pass it to the heating coils 140. As the cooling coils 130 cool the recirculated air, its relative humidity will reach 100% and the air will not be able to hold any more water and some of the water vapor will condense inside the fan coil housing 135 and on the cooling coils 130. The condensed water 136 may fall from the coils and be captured through a removable drain pan 142 that has an outlet 146 and can be stored for reuse, such as the irrigation, fogging, or underground storage where it can be cooled and re-used in the cooling system.

The flow of coolant through the cooling coils 130 may be controlled by a cooling control at the cooling or heating units 210, 220, which may be independent of one another. Further control of temperature for any one fan coil apparatus 100 may be controlled at each fan coil apparatus 100 using control valves to control the flow of heating and coolant to the apparatus.

After the recirculating air passes through the cooling coils 130, the air then passes through the heating coils 140. The heating coils 140 may be constructed like a heat exchanger. Heated water may be transmittable through the heating coils 140 through a heated water inflow conduit fluidly connected to an inlet of the heating coils 140, and a heated water return conduit fluidly connected to an outlet of the heating coil. On occasions requiring heating of the greenhouse air, the heating coil may be activated using the heating control by opening a valve to allow hot water through the heating coil 140 so that heat from the heating water can be transferred to the greenhouse air stream.

$CO_2$, oxygen, or nitrogen can be introduced into the recirculating air stream by one or more gas injectors (not shown) located downstream of the heating coils. The injectors may have an injection port that is fluidly connected to a supply. The supply may also be a propane or a natural gas burner located adjacent to the fan coil apparatus 100.

After passing through the heating coils 140, the air passes through an air grate 147 that allows air passage but would prevent tools or other larger objects left inside the fan coil apparatus 100 from falling towards the fan 150.

The air then passes through the fan 150, which has been drawing its flow since it entered the intake 102 and pushes it through the outlet 104 and into the duct tubing 190. The fan 150 may be an 1800 CFM fan that may serve 160 feet of duct tubing 190.

The fan coil apparatus panels may be made from powder coated finished aluminum or steel. The frame may be made from 304 stainless steel. The panels may be lined HDPE insulation for cleanability and noise reduction. Recyclable natural fiber insulation may also be used to increase efficiency.

The duct tubing 190 in the closed greenhouse may run beneath a plant 170 canopy, such that the recirculating air is directed upwards through holes 192 to the plants 170, and this prevents dust and other particulates from settling on the plants 170. Such an upwards-directed flow results in higher crop yields.

When set up inside a plant husbandry facility or greenhouse 50, duct runs 190 may be located between adjacent plant rows 170. Although FIG. 1B shows only one duct row 190, it should be appreciated that as shown in FIGS. 2A and 2B, multiple duct rows 190 are possible. The duct rows 190 may be straight as shown, and this is likely ideal to ensure airflow, but it is not required and other patterns are possible.

The duct rows 190 may be located below the plant canopy 90, and situated such that the vent holes 192 are aligned upwards into the canopy 90. The duct rows 190 may also be aligned level with the canopy 90 or in other orientations as long as vent holes 192 are aligned to direct airflow under the canopy 90. For example, with plants that have root issues, the duct rows 190 may be aligned such that the vent holes 192 better aerate a root system.

In the single duct run 190, the holes 192 may be aligned at at least approximately between 10 and 2 on a clock face. The holes 192 may be preset, customizable, or even adjustable. Adjustability may be achieved using a multi-layered duct run 190, where an outer layer of duct run has multiple holes 192 that can be opened or closed according to a plant husbandry facility's needs.

As shown in FIGS. 2-4, which show fan coil apparatuses 100 in other arrangements of a greenhouse 50, the duct runs 190 may have a first end 240 and a second end 250. The first end 240 is closer to the fan coil apparatus 100 that provides the circulating air within the airflow system 200, and the second end 250 is at the terminal end of the duct run 190. The second end 250 may be closed, have openings, or may have adjustable openings to allow adjustment of air speed through the vent holes 230.

The duct 190 itself may be made from 4 mm-10 mm thick to thicker polyethylene, which allows for easy installation, repair (duct tape or similar adhesive tape), and inexpensive disposal and replacement at the end of a growing season. The duct run 190 may have an outer diameter of 6-36 inches, depending on the needs of a plant husbandry facility.

Scaffolding 260 and wiring 262 may be used to orient and support individual circulation fans and duct runs 190. Other support systems may be used as well depending on space availability and height of the plant canopy 90.

During installation, a 24 inch fan size may be reduced through a reducer to 8 inches. For plant husbandry facilities where multiple runs would be advantageous, the fan coil apparatus 100 or reducer may attach to a manifold 217 that splits the fan output into many necessary runs, such as 4 and 5 duct runs 190 shown in FIGS. 3 and 4. In use with a 2000 cfm fan, 5-700 cfm per 50 foot run currently yields desirable results although more testing may optimize these findings.

While the invention has been described with reference to the embodiments above, a person of ordinary skill in the art would understand that various changes or modifications may be made thereto without departing from the scope of the claims.

The invention claimed is:

1. A fan coil apparatus for a greenhouse comprising:
a housing with an intake and an outtake further comprising:
a filter that filters recirculating air that enters the intake;
cooling coils that cool the recirculating air and condense water therefrom;
heating coils that heat the air; and
a fan that pulls air through the intake and out of the housing through the outtake;
wherein the cooling coils and the heating coils are contained within a coil housing that does not include the filter or the fan.

2. The fan coil apparatus of claim 1, wherein the filter is an active-field polarized media filter.

3. The fan coil apparatus of claim 1, further comprising a sterilization system that includes an ultraviolet light purifier.

4. The fan coil apparatus of claim 1, wherein the cooling coils and the heating coils have independent controls.

5. The fan coil apparatus of claim 1, wherein the coil housing has holes therein that allow for passage of the condensate water.

6. The fan coil apparatus of claim 5, wherein the coil housing is angled with respect to air flow through between the intake and the outtake.

7. The fan coil apparatus of claim 1, wherein at least one of the cooling coils and heating coils are fed coolant through piping that extends through a top of the housing.

8. The fan coil apparatus of claim 1, wherein the air out of the outtake has an ideal temperature point, and the cooling coils are configured to lower the air through the cooling coils below the ideal temperature point.

9. The fan coil apparatus of claim 1, wherein the cooling coils and the heating coils are controlled by water.

10. The fan coil apparatus of claim 1, furthering comprising a removeable drip pan that collects the condensate water.

11. The fan coil apparatus of claim 10, further comprising an air grate that allows for passage of air flow around the removeable drip pan.

12. The fan coil apparatus of claim 1, wherein the air, after passing through the fan, passes into a duct that runs under a plant canopy.

13. The fan coil apparatus of claim 12, wherein the duct contains holes that direct the recirculating air upwards.

14. The fan coil apparatus of claim 13, wherein a speed of the recirculating air is adjustable.

15. The fan coil apparatus of claim 12, wherein the outtake is connected to a manifold that connects to multiple ducts that run under a plant canopy.

16. An air circulation system in a greenhouse comprising fan coil apparatuses that direct air through ducting, wherein each fan coil apparatus has an outtake that connects to the ducting, wherein each of the fan coil apparatuses comprise:
a housing with an intake and an outtake further comprising:
a filter that filters recirculating air that enters the intake;
cooling coils that cool the recirculating air and condense water therefrom;
heating coils that heat the air; and
a fan that pulls air through the intake and out of the housing through the outtake;
wherein the cooling coils and the heating coils are contained within a coil housing that does not include the filter or the fan.

17. The air circulation system of claim 16, wherein the ducting contains holes that direct the recirculating air upwards into a plant canopy.

18. The air circulation system of claim 16, wherein the ducting is polyethylene.

19. The air circulation system of claim 16, wherein the fan coil apparatus's cooling coils are connected to a central cooling unit.

20. The air circulation system of claim 16, wherein the fan coil apparatus's heating coils are connected to a central heating unit.

* * * * *